Patented Nov. 6, 1945

2,388,447

UNITED STATES PATENT OFFICE 2,388,447

METHOD OF MAKING GRAPHITE PENCIL LEADS AND SIMILAR ARTICLES

Halver R. Straight, Adel, Iowa

No Drawing. Application February 26, 1942,
Serial No. 432,456

22 Claims. (Cl. 106—56)

This invention relates to the manufacture of pencil leads and similar articles which are composed in large part of graphite.

Graphite pencil leads, crucibles, and the like are generally made of a mixture of graphite with sufficient clay to produce a solid body when the mixture, after being moulded or extruded in proper shape while in plastic condition, is dried and then fired at a temperature sufficient to form a bond between the clay and graphite particles. Other things being equal, the greater the proportion of clay used, the greater will be the strength of the completed article against breaking. At the same time, in the case of pencil leads, an increase in proportion of clay to graphite will increase the "hardness" of the rod as regards its friability or the readiness with which it may be abraded away by attrition upon the paper in writing.

A general object of the present invention is to provide a method of producing such fired ceramic articles which will be of increased strength without increasing the proportion of clay to graphite. A more specific object is to provide such a method for production of pencil leads which will not entail a corresponding increase of the "hardness" of the rod as a marking element.

Other objects and advantages of the invention will be pointed out or indicated hereinafter or will become apparent to one skilled in the art upon an understanding of it or upon use of it in practice.

The clays suitable for use for the production of fired ceramic bodies, such as graphite pencil leads, are those made up for the most part of finely divided silica with a lesser percentage of aluminates, and a smaller, though appreciable, content of metal compounds, such as sulphates and carbonates of calcium and magnesium, some of which may be soluble in water and others insoluble. These metal compounds perform an important part in consolidation of the discrete particles into a unitary body, in that upon firing they act as fluxes to promote melting of superficial portions of the silica particles, thereby producing a crude glass bond or matrix which, upon setting when cooled, holds the component particles of the body together. If this bond is distributed uniformly throughout the composite body, both the structural strength and the friability of the latter will be more uniform than if the bond is unevenly distributed, and, as in the case of a conglomerate of graphite and silica particles, the more completely each particle is covered with the bond, the more uniform will be the distribution of the bonding glass throughout the entire mass, and hence the greater and more uniform will be the structural strength of the fired body. It follows, therefore, that the more completely the individual particles are covered with the flux, the more completely and uniformly will the bond be formed in the conglomerate, and hence the more uniform and complete will be the bonding of the particles in the finished article. Inasmuch as it is desirable that all of the particles in a pencil lead be extremely fine, they afford, in the aggregate, a very considerable amount of surface to be covered by the fluxes, and because of this fact and the fact that the particles are so fine, the desired distribution of the fluxes uniformly throughout the mix is a matter of great difficulty. Moreover, ordinary simple water-borne fluxes tend to migrate to the surface of a moulded body as drying takes place, and thus become concentrated in the surface portions instead of remaining uniformly distributed throughout the mass of the body.

The present invention is directed primarily to obtaining a complete and uniform distribution of the fluxes upon the surfaces of the component graphitic and siliceous particles of the mix in a substantially insoluble condition and finely divided form. I have found that this may be attained by using in the mix various materials in addition to the clay, which materials have the effect of forming a wetting mixture comprising soaps and emulsions carrying the metal compounds in substantially insoluble form and which soaps and emulsions are of a character to induce extensive surface wetting or filming of the clay and graphite particles because of what appears to be certain affinitive or polar attractions between such particles and the metal compounds when in substantially insoluble polar molecular condition. I have also found that by providing in the mix certain flux constituents, which may be derived either wholly or in part from the clay itself or may be added either wholly or in part, the temperature at which the bond is formed may be appreciably reduced and formation of the bond more accurately controlled. At the same time, inasmuch as the thin rods for pencil leads are formed by extrusion of the plasticized mixture through dies and then straightened before drying and firing, it is highly important that the mix, as prepared for extrusion, have adequate plastic strength to hold together and retain its moulded form and at the same time suitable moldability to permit its being moulded readily, as by extrusion through the dies under moderate pressure. My improved method is designed also to produce these desirable characteristics in the mix.

For the production of a writing lead by the method which constitutes the present invention, the proportion of clay to graphite is determined at the outset, of course, in accordance with the degree of writing "hardness" desired in the finished article. The graphite is of the refined crystalline type customarily employed in pencil lead manufacture, and I prefer to use a very fine grained clay which has been suitably freed from impurities, and which may comprise silica in a range of from 55% to 70%, aluminates in a range from 40% to 20%, and soluble and insoluble metal compounds in a proportion of from 3% to 10%. As an example of a mix for producing a lead having very soft writing characteristics, the ratio of clay to graphite may be as low as 1:19. These solid ingredients are ground together in wet condition in a fine grinding mill until reduced to approximately 1000 mesh grain size, during which grinding a considerable proportion of the particles will be reduced to approximately colloidal size. For the wetting and plasticizing of the solid constituents in the grinding operation, I prepare an emulsion or wetting mixture by first forming an alkaline solution of silicates, as by dissolving, in suitable quantities of water, sodium silicate and potassium hydroxide in such quantities as to supply the sodium oxide in a proportion of about 45 parts to 80 parts of potassium hydroxide. For example, for each dry weight ton of graphite and clay, I may use 2 pounds of caustic potash to 10 pounds of a 33.5 solution of sodium silicate containing 6.3% of $Na_2O$ and 24.6% of $SiO_2$. The amount of water used should be such as to give a solution having a pH upwards of 9 when the sodium silicate and caustic potash are dissolved in it. With this alkaline solution I then react a quantity of a carboxylic carboxyl acid which includes a hydrocarbon radical and will in part combine with some of the alkali to form soaps, succinic acid being an example of such acids. The acid is supplied in quantity sufficient to produce from the solution appreciable quantities of molecular silica or silicates and sodium and potassium soaps, e. g., one pound of the acid to the ton of clay and graphite in the example given; and in addition to the acid it is of advantage to use a small quantity of a light hydrocarbon oil, such as kerosene, in a proportion of about 5 pounds per ton of the graphite and clay. This mixture may be formed quite readily with vigorous agitation to produce a stable emulsion in which the precipitated substances are held in suspension or dispersion in colloidal or monomolecular forms. This wetting mixture is ground with the solid ingredients and such amount of water as may be required to give the mixture a free-flowing consistency, the mixing and grinding being carried on in a fashion best calculated to obtain contact of all of the solid particles with the wetting mixture, which may be aided by applying the mixture to the mass in the form of a finely atomized spray. This wetting mixture has a very pronounced affinity for the clay and graphite particles which tends to spread it uniformly over their surfaces in the form of a thin wetting film in which the colloidal or molecular silica and potassium and sodium soaps and compounds are uniformly distributed. Water-soluble metallic compounds present in the clay itself are taken up by the wetting mixture and distributed in the wetting films upon the surfaces of the particles along with the other flux material introduced in the wetting mixture itself. The spreading and wetting action of these films upon the solid particles may be further enhanced by the use, in the wetting mixture, of a very small quantity of steam distilled pine oil in a proportion approximating ½ pound per ton of dry ingredients.

After being thus thoroughly mixed and ground, the plastic mass is dried to the point where its moisture content constitutes approximately 14% of its total weight, in which condition it may be extruded through fine dies in the usual fashion to produce the slender threads or rods of proper diameter for pencil leads. These, after being further dried in straightened form, are fired in the customary manner at a temperature suitable to produce the desired glass bond by fusion of the film-distributed silica, potassium and sodium compounds, together with superficial portions of the clay particles and interlaminated silica in the graphite particles, for example, at about 1550° to 1650° F. The formation of the glass bond is accelerated during the firing process by reason of the intimate association of the molecular silica with the fluxes added or already naturally present in the clay, as well as by the eutectic action of the sodium and potassium.

By virtue of the fact that the molecular silica and the flux materials have been uniformly and thoroughly distributed by the filming action of the wetting mixture upon the particles, the bond which is produced by the firing is formed uniformly throughout the body of the rod and hence produces a finished article of increased and uniform structural strength and uniform consistency as to its friability for making marks on paper or the like.

In addition to the desirable characteristics thus obtained in the finished article, the method obtains additional advantages in the manufacturing procedure itself. The uniform filming of the particles contributes to distribution of the oil ingredients of the mixture which, by their lubricating action, facilitate the extrusion of the material and permit the graphite and clay particles to slip into a more compact or intimate relationship with one another, even though the amount of oil used is very small in proportion to the total mass, and also permit of a very substantial reduction in the amount of water required in the mass to give it the necessary plasticity or moldability for the extrusion. At the same time, such reduction in the amount of water in the material reduces the amount of shrinkage which takes place in the drying and firing treatments. Moreover, by establishing in the mixture a sodium and potassium content in the ratio of approximately 4.5 of sodium to 8 of potassium, a eutectic action is obtained which permits of the formation of the desired amount of bond at a lower temperature than is ordinarily effective, it being understood, however, that, within limits, the higher the firing temperature, the greater will be the amount of bonding glass formed.

A further reduction of the firing temperature may be availed of if a soluble compound of molybdenum, such as sodium molybdate, and a water-soluble compound of antimony, such as sodium antimoniate, are added to the wetting mixture in very small proportions, such as one-tenth of a pound per ton of the original solids.

It will be understood, of course, that the particular proportions indicated above are intended to be illustrative rather than definitive, for the reason that the beneficial results indicated may be obtained, in greater or less degree, even with various other quantities or proportions of the various ingredients. It is to be observed, however, that the best effects are obtained if a pH of approximately 9 to 9.25 is maintained in the mass during the mixing of the wetting mixture and solids, as a definite alkalinity is quite important to the stability and wetting effect of the filming suspensoid, but at the same time the alkalinity, if carried to too high a point, will result in a decrease of the plastic strength or coherence of the mass. In this connection, it is to be observed that the alkalinity in the clay itself is to be taken into consideration, both as regards the total amount of alkalies added to it in the wetting mixture and as regards the desired eutectic proportions between the sodium and potassium content. Accordingly, if the clay itself contains a substantial proportion of sodium compounds or other flux compounds, allowance therefor should be made in determining the amount to be added in the mixture. While I have found succinic acid to be highly effective for production of a fluxing mixture having the desired filming action on particles of graphite, it is possible to produce a usable treating mixture by use of other carboxylic acids, such as the higher fatty acids, oleic acid for example, which are soap-forming in alkaline water solutions containing metallic silicates. Where such higher fatty acids are used, the desired lubricating effect may be obtained with a smaller proportion of additional oil than that indicated above. Also, if it is desired to obtain a higher proportion of silica in the treating mixture without disturbing the eutectic proportions of sodium and potassium, such may be accomplished by using a suitable proportion of potassium silicate in the place of some or all of the potassium hydroxide specified in the example given above.

What I claim is:

1. A method of making ceramic articles of the type described, which comprises forming a wetting mixture by reacting an alkaline water solution of a metallic silicate compound with a higher fatty acid which is soap forming in such a solution, agitating the resulting mixture to keep the reaction products in suspension, filming a mass of ground graphite and clay particles with the wetting mixture and converting the mass into a moldable plastic condition, shaping an article from the plastic mass and firing the article at a temperature effective to flux a portion of the silica present, whereby to produce a bonding glass, and cooling the glass to form a bond uniting the solid particles.

2. A method as specified in claim 1 and wherein the metallic silicate solution comprises potassium and sodium compounds in proportions to produce eutectic effects upon the silicates when fired.

3. A method as specified in claim 1 and wherein a small proportion of hydrocarbon oil is added to and emulsified in the alkaline water solution with the reaction products.

4. A method as specified in claim 1 and wherein the ratio of acid to dry weight of clay and graphite is of the order of one pound to the ton and the ratio of silica in the solution to said dry weight is of the order of 2.5 pounds to the ton.

5. A method as specified in claim 1 and wherein the ratio of acid to dry weight of clay and graphite is of the order of one pound to the ton and the ratio of silica in the solution to said dry weight is of the order of 2.5 pounds to the ton, and the alkali is in excess of the acid.

6. A method as specified in claim 1 and wherein the ratio of acid to dry weight of clay and graphite is of the order of one pound to the ton and the ratio of silica in the solution to said dry weight is of the order of 2.5 pounds to the ton, and the alkali is in excess sufficient to produce a pH of not less than 9 in the mass during mixing of the wetting mixture with the clay.

7. A method as specified in claim 1 and wherein a small proportion of steam distilled pine oil is included in the wetting mixture.

8. A method as specified in claim 1 and wherein a small proportion of a water soluble compound of molybdenum is included in the wetting mixture.

9. A method of preparing a mixture of graphite and clay for fire bonding which comprises forming a wetting mixture by partially reacting an alkaline water solution of an alkali metallic silicate with succinic acid, agitating the mixture to keep the reaction products distributed in it, reducing the graphite and clay to pulverulent condition and filming the particles of clay and graphite with the wetting mixture.

10. A method as specified in claim 9 and wherein the alkaline metallic silicate solution comprises potassium and sodium compounds in proportions to produce an eutectic effect upon the silicates when fired.

11. A method as specified in claim 9 and wherein a small proportion of hydrocarbon oil is added to and emulsified in the alkaline water solution with the reaction products.

12. A method as specified in claim 9 and wherein the ratio of acid to dry weight of clay and graphite is of the order of one pound to the ton and the ratio of silica in the solution to said dry weight is of the order of 2.5 pounds to the ton.

13. A method as specified in claim 9 and wherein the ratio of acid to dry weight of clay and graphite is of the order of one pound to the ton and the ratio of silica in the solution to said dry weight is of the order of 2.5 pounds to the ton, and the alkali is in excess of the acid.

14. A method as specified in claim 9 and wherein the ratio of acid to dry weight of clay and graphite is of the order of one pound to the ton and the ratio of silica in the solution to said dry weight is of the order of 2.5 pounds to the ton, and the alkali is in excess sufficient to maintain a pH of not less than 9 in the mass during the mixing of the wetting mixture with the clay.

15. A method as specified in claim 9 and wherein a small proportion of steam distilled pine oil is included in the wetting mixture.

16. A method as specified in claim 9 and wherein a small proportion of a water soluble compound of molybdenum is included in the wetting mixture.

17. A method as specified in claim 9 and wherein the alkaline solution comprises silica in the form of sodium silicate and potassium hydroxide in proportion to produce eutectic effects upon the clay silicates when fired.

18. A method as specified in claim 9 and wherein the solution comprises sodium in the form of sodium silicate and potassium in the form of potassium silicate in proportion to produce eutectic effects upon the clay silicates when fired.

19. A method of making ceramic articles which comprises forming an alkaline wetting mixture in the nature of a suspensoid of colloidal silica and silica-fluxing metallic compounds and soaps of a fatty acid in alkaline water, grinding clay with the wetting mixture to an extent effective to pulverize the clay and film its particles with the wetting mixtures, converting the mass into a mouldable plastic condition, shaping an article from the plastic mass, and firing the article at a temperature effective to flux the colloidal silica, whereby to produce a glass bond for uniting the component particles of the article.

20. A method of making ceramic articles of the type described, which comprises forming a wetting mixture by reacting an alkaline water solution of a metallic silicate compound with an acid which is soap forming in such a solution, agitating the resulting mixture to keep the reaction products in suspension, filming a mass of ground graphite and clay particles with the wetting mixture and converting the mass into a moldable plastic condition, shaping an article from the plastic mass and firing the article at a temperature effective to flux a portion of the silica present, whereby to produce a bonding glass, and cooling the glass to form a bond uniting the solid particles.

21. A method of making ceramic articles of the type described, which comprises forming a wetting mixture by reacting an alkaline water solution of a metallic silicate compound with an acid which is soap forming in such a solution, said metallic silicate solution comprising potassium and sodium in proportions to produce an eutectic effect upon the silicate when fired, agitating the resulting mixture to keep the reaction products in suspension, filming a mass of ground graphite and clay particles with the wetting mixture and converting the mass into a moldable plastic condition, shaping an article from the plastic mass and firing the article at a temperature effective to flux a portion of the silica present, whereby to produce a bonding glass, and cooling the glass to form a bond uniting the solid particles.

22. The method of preparing a mixture of graphite and clay, which comprises producing a wetting mixture by reacting an alkaline water solution of an alkali metallic silicate with an acid which is soap forming in such a solution, agitating the mixture to keep the reaction products distributed in it, and filming a mass of ground graphite and clay particles in pulverulent condition with the wetting mixture and working the mass into a moldable plastic condition.

HALVER R. STRAIGHT.

CERTIFICATE OF CORRECTION.

Patent No. 2,388,447.   November 6, 1945.

HALVER R. STRAIGHT.

It is hereby certified that error appears in the printed specification of the above numbered patent requiring correction as follows: Page 2, first column, line 38, strike out the word "carboxyl"; and second column, line 40, after "oil" insert --and lubricating--; and that the said Letters Patent should be read with this correction therein that the same may conform to the record of the case in the Patent Office.

Signed and sealed this 5th day of February, A. D. 1946.

Leslie Frazer (Seal)   First Assistant Commissioner of Patents.

the wetting mixtures, converting the mass into a mouldable plastic condition, shaping an article from the plastic mass, and firing the article at a temperature effective to flux the colloidal silica, whereby to produce a glass bond for uniting the component particles of the article.

20. A method of making ceramic articles of the type described, which comprises forming a wetting mixture by reacting an alkaline water solution of a metallic silicate compound with an acid which is soap forming in such a solution, agitating the resulting mixture to keep the reaction products in suspension, filming a mass of ground graphite and clay particles with the wetting mixture and converting the mass into a moldable plastic condition, shaping an article from the plastic mass and firing the article at a temperature effective to flux a portion of the silica present, whereby to produce a bonding glass, and cooling the glass to form a bond uniting the solid particles.

21. A method of making ceramic articles of the type described, which comprises forming a wetting mixture by reacting an alkaline water solution of a metallic silicate compound with an acid which is soap forming in such a solution, said metallic silicate solution comprising potassium and sodium in proportions to produce an eutectic effect upon the silicate when fired, agitating the resulting mixture to keep the reaction products in suspension, filming a mass of ground graphite and clay particles with the wetting mixture and converting the mass into a moldable plastic condition, shaping an article from the plastic mass and firing the article at a temperature effective to flux a portion of the silica present, whereby to produce a bonding glass, and cooling the glass to form a bond uniting the solid particles.

22. The method of preparing a mixture of graphite and clay, which comprises producing a wetting mixture by reacting an alkaline water solution of an alkali metallic silicate with an acid which is soap forming in such a solution, agitating the mixture to keep the reaction products distributed in it, and filming a mass of ground graphite and clay particles in pulverulent condition with the wetting mixture and working the mass into a moldable plastic condition.

HALVER R. STRAIGHT.

---

CERTIFICATE OF CORRECTION.

Patent No. 2,388,447.   November 6, 1945.

HALVER R. STRAIGHT.

It is hereby certified that error appears in the printed specification of the above numbered patent requiring correction as follows: Page 2, first column, line 38, strike out the word "carboxyl"; and second column, line 40, after "oil" insert --and lubricating--; and that the said Letters Patent should be read with this correction therein that the same may conform to the record of the case in the Patent Office.

Signed and sealed this 5th day of February, A. D. 1946.

Leslie Frazer (Seal)   First Assistant Commissioner of Patents.